Oct. 21, 1958 S. G. VELONIS 2,856,611
THERAPEUTIC BATH DEVICE
Filed July 1, 1955 2 Sheets-Sheet 1
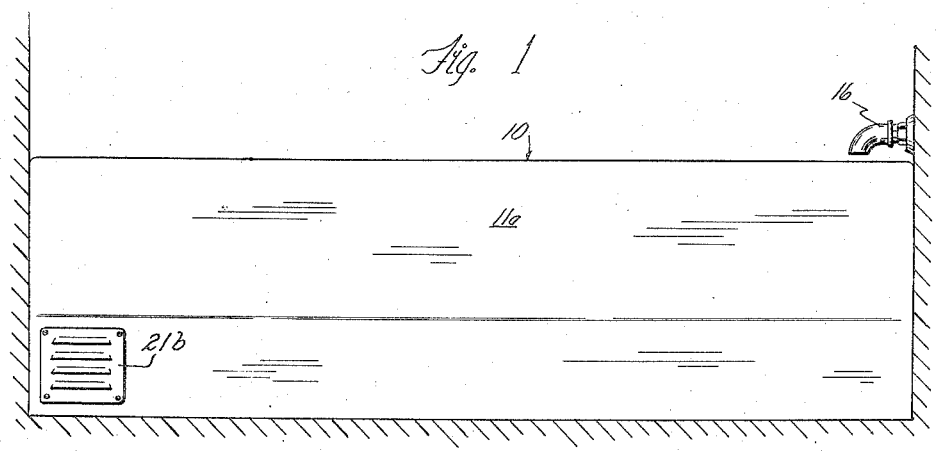
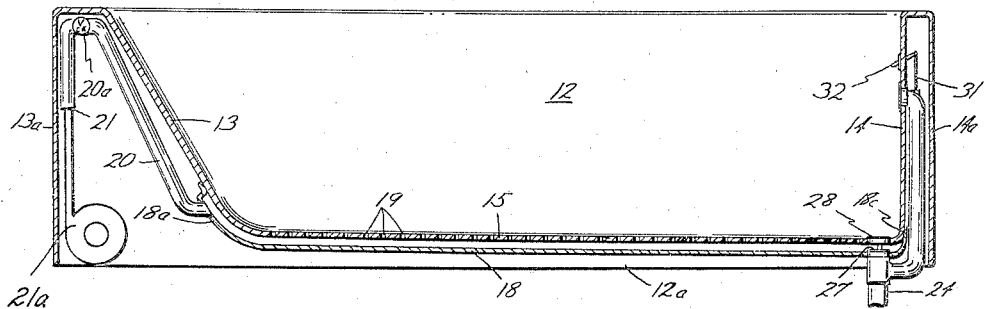
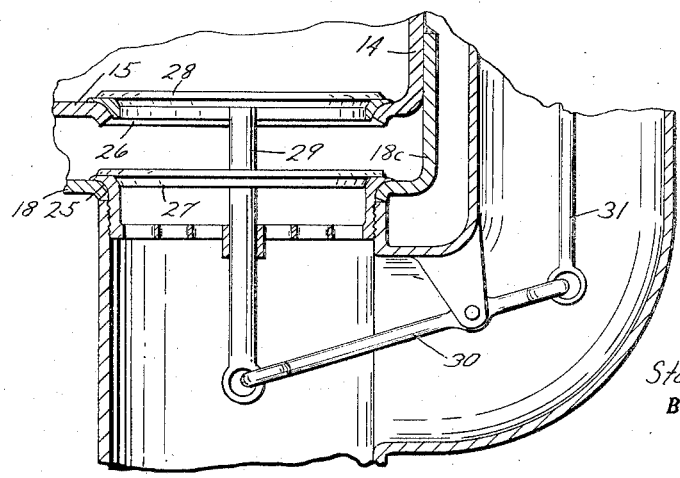
INVENTOR.
Stamatis George Velonis
BY
Atty.

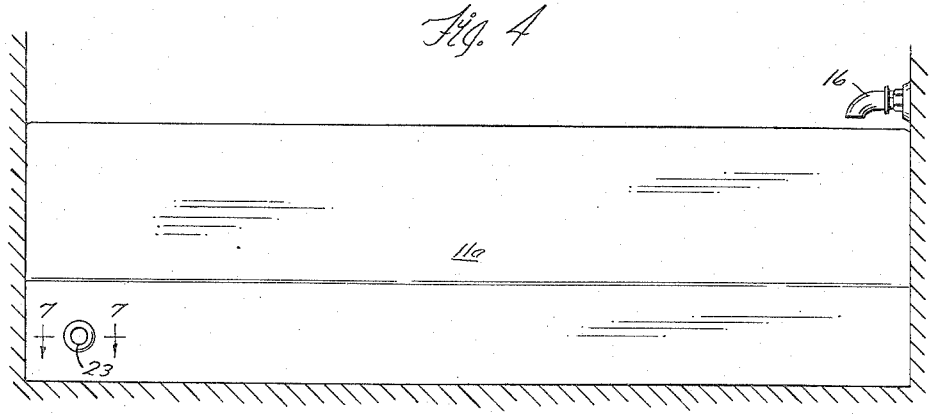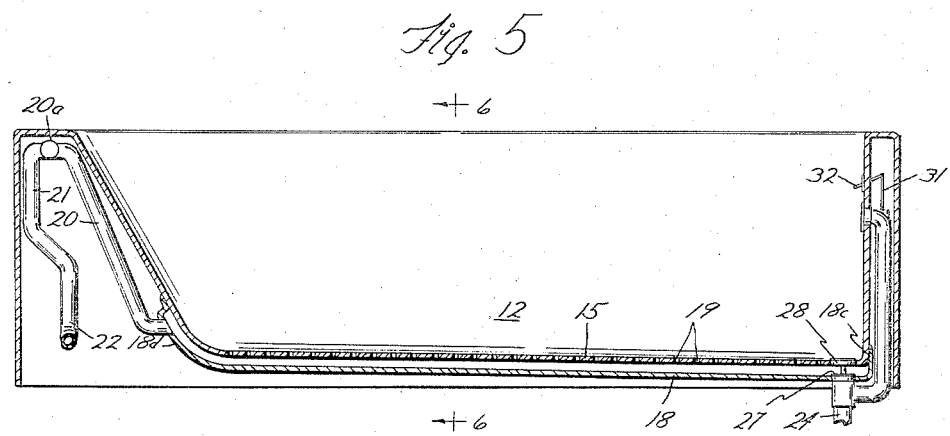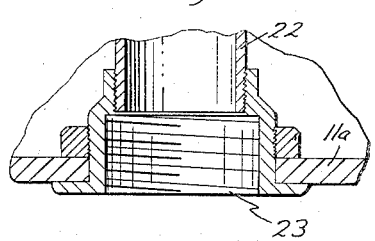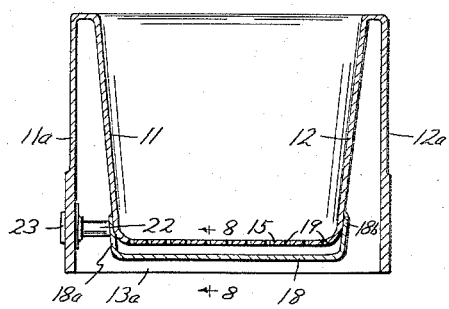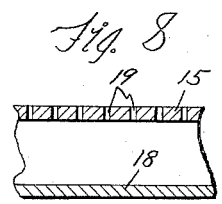

2,856,611

THERAPEUTIC BATH DEVICE

Stamatis George Velonis, Opportunity, Wash.

Application July 1, 1955, Serial No. 519,563

7 Claims. (Cl. 4—180)

The present invention relates to improvements in a therapeutic bath device.

The beneficial effects of hydromassage resulting from immersion in water that is rapidly agitated have gained widespread recognition. Various agitating devices are on the market today for this purpose. However, most of them lack certain conveniences for the individual taking self treatment at home.

It is the principal purpose of the present invention to provide a bathtub which is fully capable of use in the ordinary manner and in addition is adapted to have the entire body of water within the tub subjected to agitation by the passage of air bubbles upwardly from the bottom of the tub, and against a body member residing at any position within the tub.

To accomplish this purpose, an ordinary bathtub is fitted with another lower bottom portion directly beneath the normal bottom wall of the tub. Air is supplied under pressure to the space between the bottom wall and the lower bottom portion. A multiplicity of fine apertures are formed throughout the horizontal portion of the normal bottom wall above the air space to allow air to bubble up through the water. Since the agitation produced by bubbling air is substantially localized, and since it is desired to produce the agitation in all portions of the tank, the apertures formed in the bottom wall are very fine and are spaced close to each other throughout the flat portion thereof, and are so designed that the water pressure above each is substantially equal, so as to produce the best distribution of air.

The nature and advantages of my invention will appear more clearly from the following description and the accompanying drawings, wherein a preferred form of the invention is shown. It should be understood, however, that the drawings and description are illustrative only and are not intended to limit the invention except insofar as it is limited by the claims.

In the drawings:

Figure 1 is a side elevational view of a bathtub embodying my invention;

Figure 2 is a longitudinal sectional view of the tub shown in Figure 1;

Figure 3 is an enlarged sectional view through the drain structure of the tub;

Figure 4 is a side view of a slightly modified tub construction;

Figure 5 is a longitudinal sectional view through the tub of Figure 4;

Figure 6 is a vertical sectional view taken substantially on the line 6—6 of Figure 5;

Figure 7 is an enlarged fragmentary sectional view taken substantially on the line 7—7 of Figure 5; and Figure 8 is an enlarged fragmentary sectional view taken on the line 8—8 of Figure 6.

Referring now to the drawings, my invention is shown as embodied in a bathtub 10. The tub 10 has a pair of side walls 11 and 12, a sloping rear wall 13 and a front wall 14. In the particular tub shown in the drawings, each of the walls 11, 12, 13 and 14 has a vertical outside skirt 11a, 12a, 13a and 14a formed thereon to give the tub 10 a more modernistic appearance. The skirts 11a, 12a, 13a and 14a are somewhat longer than the side walls in order to support the tub 10. The tub 10 is completed by a substantially horizontal bottom wall 15. A water faucet is shown at 16 to supply water to the tub at the desired temperature.

Spaced below the bottom wall 15 is another lower bottom portion 18. The portion 18 has upturned flanges 18a, 18b, and 18c at its sides and front to engage the bottom wall 15. An upturned flange 18d at the rear of the portion 18 extends upwardly parallel to the sloping rear wall 13 a short distance and then engages it. The flanges 18a, 18b, 18c and 18d are cemented to the tub 10 to secure the portion 18 in place. As shown in the drawings, a narrow space exists between the bottom 15 and the portion 18. In the bottom wall 15 above this space, I provide a multiplicity of closely spaced small apertures 19. The apertures 19 are formed only in the horizontal portion of the bottom 15, and do not exist in the curved portions thereof where the walls 11, 12, 13 and 14 blend with the bottom. Preferably the apertures are very small. As shown by Figure 8, their diameter is substantially less than the thickness of the wall 15.

An air pipe 20 is connected to the rear flange 18d of the portion 18. The pipe 20 extends upwardly and is bent over to provide an end portion 21 for attachment to an air blower 21a. A louvre plate 21b is provided in the side skirt 11a of the tub to let air into the blower. The pipe 20 has a check valve 20a therein to prevent water from passing upwardly therein. With this construction, air under pressure may be introduced to the space between the normal bottom wall 15 and the portion 18. This air is released upward by the apertures 19 to bubble through the water in the tub and impart to it a motion similar to that existing in boiling water. I have found that this kind of agitation of the water is particularly effective in obtaining the desired therapeutic results upon body members immersed therein.

In order to provide for the best results, it is necessary to agitate the water in all parts of the tub, so the apertures 19 must be closely spaced throughout the flat portion of the bottom wall 15. It is also necessary that none of the apertures 19 pass through the tub bottom at a level much higher than the rest. Since the passage of air through a particular aperture 19 is dependent upon the water pressure above the aperture, and since the water pressure is a direct function of the height of the water above the aperture, it can readily be seen that if any of the apertures were allowed to pass through the tub 10 in the sides 11 and 12, or very far up on the curved portion where the sides 11 and 12 blend with the bottom 15, then these apertures, being closer to the water surface than the rest would present a lesser pressure against the air, and a greater amount would pass through, thus depriving the lower apertures 19 of air passage, and causing little or no agitation of the water in the middle of the tub. I have found that if the apertures 19 are placed only in the flat portion of the tub, and are restricted to a diameter of less than $\frac{1}{16}$ of an inch and preferably about $\frac{1}{32}$ of an inch, and if the airspace between the normal bottom wall 15 and the portion 18 is restricted to about $\frac{1}{2}$ of an inch, the best results are obtained. A slight difference in water height over different apertures is, however, not particularly noticable with the many small apertures used. I have also found that in those tubs 10 wherein a substantial drainage slope is present in the bottom wall 15 between the rear wall 13 and the front wall 14 the best air distribution is obtained by enlarging the apertures 19 which are closest to the front wall 14 to offset the effect of the increased depth of the water at the front of the tub.

Figures 4, 5 and 7 show how the pipe end 21 has an extension 22 to connect to a coupling 23 for the blower tube of a household vacuum cleaner. Thus where desired the water agitation can be had by using a common household appliance such as a vacuum cleaner for that purpose. A heating element (not shown) may also be used to heat the air supplied to the pipe 20 to maintain a constant temperature in the bathwater.

In order to remove the water from the tub 10, a waste pipe 24, connected to a sewage system is provided. The waste pipe 24 is connected to a drain opening 25 in the lower bottom portion 18. Directly above the drain opening 25, a second drain opening 26 is provided in the upper bottom wall 15. A suitable pair of closures 27 and 28 are provided on a common stem 29 to seal both the drain openings 25 and 26. The closures 27 and 28 are operated by well known concealed link and lever means 30—31 from a hand lever 32.

The use of the tub 10 is very simple. The operator merely turns on the air, and then fills the tub 10 by means of the faucet 16. As the water enters the tub, the air pressure below the upper bottom wall 15 prevents it from passing through the apertures 19. The closures 27 and 28 are down to seal the drain openings 25 and 26 at this time. After the tub has been filled, the patient is placed therein to receive treatment. When it is desired to empty the tub, the hand lever 32 may be operated to lift the closures 27 and 28 and expose the openings 25 and 26. The water runs through the opening 26 in the bottom wall 15, and through the opening 25, and is discharged into the waste pipe 24. The air pressure may or may not be turned on at this time. It is, however, preferable that it is left on until the water is drained to prevent water, etc. from passing into the space between the upper bottom wall 15 and the lower bottom wall portion 18. Since the agitation of the water by the air bubbles keeps the dirt or impurities suspended in the water, it is all passed down the waste pipe. If any dirty water does get between the wall 15 and the portion 18 it is readily washed out using clean water and the air pressure.

It is believed that the nature and advantages of my invention appear clearly from the foregoing description.

Having thus described my invention, I claim:

1. A therapeutic bathtub having side walls and end walls and a double bottom wall, the double bottom wall consisting of an upper substantially flat perforated portion provided with a multiplicity of apertures and a lower bottom wall portion, the upper flat portion being joined to the side and end walls by curved unperforated wall portions, the lower bottom wall portion being imperforate, aligned drain openings in said bottom wall portions, closures for said drain openings, an air pipe extending through said lower bottom wall portion to admit air under pressure between said upper and lower bottom wall portions, said pipe extending upwardly above the double bottom wall, means connected to said pipe to supply air under pressure to the pipe, and a check valve in the pipe to prevent passage of water from the tub to the air supply means.

2. A therapeutic bathtub having side walls, end walls, a substantially flat perforated bottom wall with a multiplicity of apertures therein, said flat bottom wall being joined to the side and end walls by curved unperforated wall portions, an unperforated lower bottom wall portion spaced below said bottom wall, vertical flange portions on said lower bottom portion secured to said curved wall portions whereby to support said lower bottom portion in spaced relation to said bottom wall and to seal the perimeter of the interspace between said bottom wall and said lower bottom portion, an air pipe extending through said lower bottom portion to admit air under pressure between the bottom wall and the lower bottom portion, means connected to the pipe to supply air under pressure to the pipe, a check valve in the pipe to prevent passage of water from the tub to the air supply means, aligned drain openings in the bottom wall and the lower bottom portion, and closures on a common stem closing both of said openings.

3. A therapeutic bathtub having side walls and end walls and a double bottom wall, the double bottom wall consisting of an upper substantially flat perforated portion provided with a multiplicity of apertures and a lower bottom wall portion, the upper flat portion being joined to the side and end walls by curved unperforated wall portions, the lower bottom wall portion being imperforate, aligned drain openings in said bottom wall portions, closures for said drain openings, an air pipe extending through said lower bottom wall portion to admit air under pressure between said upper and lower bottom wall portions, means connected to said air pipe to supply air under pressure to the pipe, and means in the pipe to prevent passage of water therethrough from the tub to the air supply means.

4. The combination defined in claim 3 wherein the means in the pipe to prevent passage of water therethrough from the tub to the air supply means comprises a check valve in the air pipe.

5. A therapeutic bathtub having side walls, end walls, a substantially flat perforated bottom wall with a multiplicity of apertures therein, said flat bottom wall being joined to the side and end walls by curved unperforated wall portions, an unperforated lower bottom wall portion spaced below said bottom wall, vertical flange portions on said lower bottom portion secured to said curved wall portions whereby to support said lower bottom portion in spaced relation to said bottom wall and to seal the perimeter of the interspace between said bottom wall and said lower bottom portion, an air pipe extending through said lower bottom portion to admit air under pressure between the bottom wall and the lower bottom portion, means connected to the pipe to supply air under pressure to the pipe, means in the pipe to prevent passage of water from the tub to the air supply means, aligned drain openings in the bottom wall and the lower bottom portion, and closures on a common stem closing both of said openings.

6. A therapeutic bathtub having side walls, end walls, and a substantially flat bottom wall joined to the end walls and side walls by curved wall portions, said bottom wall having an air passage therein and having a multiplicity of vertical apertures therein communicating the air passage with the space above the bottom wall, the curved portions being unperforated, a drain opening in the bottom wall, said passage communicating with the opening, means to close the passage from the drain opening, an air pipe connected to the passage to admit air under pressure to the passage, means connected to the air pipe to supply air under pressure thereto, and means in the pipe to prevent passage of water therethrough from the tub to the air supply means.

7. The combination defined in claim 6 wherein the means in the pipe to prevent passage of water therethrough from the tub to the air supply means comprises a check valve in the air pipe.

References Cited in the file of this patent

UNITED STATES PATENTS

| 1,350,974 | Kolshorn | Aug. 24, 1920 |
| 1,781,325 | Dowling | Nov. 11, 1930 |
| 1,896,938 | Borowsky | Feb. 7, 1933 |